D. HUNSICKER.
Clover Huller.
No. 728.
Patented May 8, 1838.
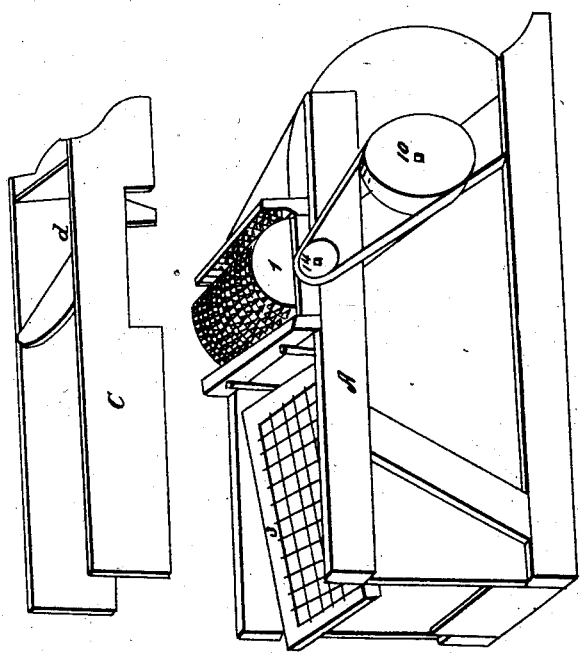
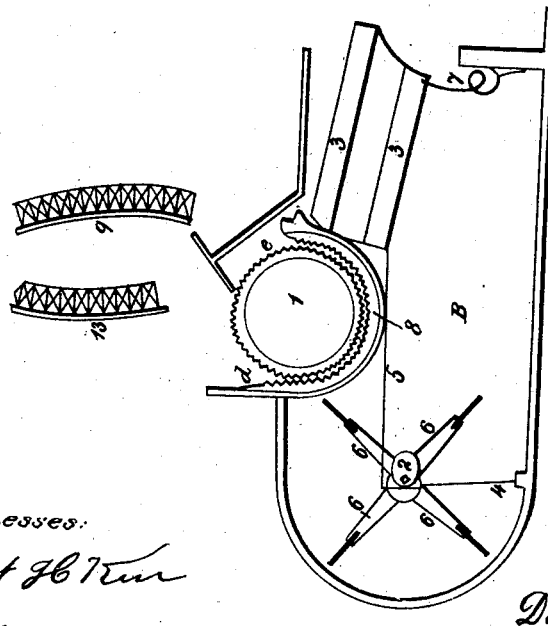
Witnesses:
Robert H Kim
Elias Orwy
Inventor:
Daniel Hunsicker

UNITED STATES PATENT OFFICE.

DANIEL HUNSICKER, OF HARTLEY TOWNSHIP, PENNSYLVANIA.

MACHINE FOR HULLING CLOVER-SEED.

Specification of Letters Patent No. 728, dated May 8, 1838.

*To all whom it may concern:*

Be it known that I, DANIEL HUNSICKER, of Hartley township, Union county, and State of Pennsylvania, have invented a certain Machine for Hulling and Cleaning Clover-Seed; and I hereby declare that the following is a full and exact description thereof.

The nature of my invention consists in the manner in which the toothed cylinder and bed are constructed, and adapted to the purpose of hulling and cleaning clover seed in a more expeditious manner and with less complicated machinery than in the modes ordinarily pursued.

To enable others skilled in the art to make and use my invention, I proceed to describe its construction and mode of operation.

The entire machine is contained in a frame or box resembling a common fan machine. I make a turned cylinder of wood as shown at Fig. 1, in the drawings A, B. I make a sufficient number of cast-iron rings, toothed in the manner shown at Fig. 9. These rings I slide upon the cylinder, bringing them close together until the cylinder is covered with them, when they are secured in their places with screws or pins. I make a concave bed so deep as to embrace somewhat more than half the circumference of the cylinder. This end I line with segments of circles of cast iron toothed on the concave edges to correspond with the circles upon the cylinder as represented at Fig. 13. The rows of teeth in the cylinder are to pass between the rows of teeth on the bed so closely as to rub and tear in pieces, the clover heads which may pass between them. To one end of the cylinder I attach a pulley over which the strap of a horse or water power is to pass. On the other end of the cylinder is a pulley A Fig. 14 over which a strap passes to the large pulley Fig. 10 which turns the fanning wheel B Fig. 6. On one end of the fanning wheel shaft is fixed the oval pulley Fig. 2 by which a wooden spring Fig. 4 is set in motion so as to shake the riddles Fig. 3. In the hinder part of the box is fixed an iron or wooden spring Fig. 7 whereby the shaking of the riddles is facilitated.

The clover heads being put into the hopper or feeding box C at *d* pass between the cylinder and bed at *d* are carried around and torn or rubbed between the said cylinder and bed and then discharged at *e* upon the riddles 3, 3, when the chaff is blown away and the seed cleaned by the air from the fanning wheel 6.

What I claim as my invention and desire to secure by Letters Patent consists in making the cylinder of teeth out of separate cast iron rings in the manner herein described and also the making the concave of separate segments as herein described.

DANIEL HUNSICKER.

Witnesses:
SAML. HAUPT,
JAMES MURRAY.